US011314536B2

(12) United States Patent
Lee et al.

(10) Patent No.: US 11,314,536 B2
(45) Date of Patent: Apr. 26, 2022

(54) QUANTUM VARIATIONAL METHOD, APPARATUS, AND STORAGE MEDIUM FOR SIMULATING QUANTUM SYSTEMS

(71) Applicant: Tencent America LLC, Palo Alto, CA (US)

(72) Inventors: Chee Kong Lee, Palo Alto, CA (US); Qiming Sun, Mountain View, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 447 days.

(21) Appl. No.: 16/505,179

(22) Filed: Jul. 8, 2019

(65) Prior Publication Data

US 2021/0011748 A1     Jan. 14, 2021

(51) Int. Cl.
| | |
|---|---|
| *G06F 9/455* | (2018.01) |
| *G06N 10/00* | (2022.01) |
| *G06F 17/17* | (2006.01) |
| *G06F 17/16* | (2006.01) |

(52) U.S. Cl.
CPC .......... *G06F 9/45504* (2013.01); *G06F 17/16* (2013.01); *G06F 17/175* (2013.01); *G06N 10/00* (2019.01)

(58) Field of Classification Search
CPC .... G06F 9/45504; G06F 17/16; G06F 17/175; G06F 17/11; G06N 10/00; G06N 3/0445; G06N 3/0472
See application file for complete search history.

(56) References Cited

U.S. PATENT DOCUMENTS

| | | | |
|---|---|---|---|
| 10,275,717 B2 | 4/2019 | Babbush et al. | |
| 2015/0046457 A1* | 2/2015 | Weinstein | G06F 16/287 707/737 |
| 2019/0302107 A1* | 10/2019 | Kauffman | G16C 20/50 |

OTHER PUBLICATIONS

Amin et al. "Quantum Boltzmann Machine". DOI: 10.1103/PhysRevX. 8.021050. Phys. Rev. X 8, 021050 (2018). 2018. 11 Pages. (Year: 2018).*

Jones et al. "Variational quantum algorithms for discovering Hamiltonian spectra". DOI: 10.1103/PhysRevA.99.062304. Physical Review A 99, 062304 (2019) Jun. 6, 2019.. 9 Pages. (Year: 2019).*

(Continued)

*Primary Examiner* — Eunhee Kim
(74) *Attorney, Agent, or Firm* — Crowell & Moring LLP

(57) ABSTRACT

The present disclosure discloses a method for obtaining optimal variational parameters of a ground state wavefunction for a Hamiltonian system. The method includes initializing a plurality of variational parameters and sending the variational parameters to a quantum computing portion to output a plurality of measurement results. The method includes transmitting the measurement results to a classical computing portion to update the plurality of variational parameters based on the plurality of measurement results and an update rule, and determining whether a measured energy satisfies a convergence rule. When the measured energy does not satisfy the convergence rule, the method includes sending the plurality of updated variational parameters to the quantum computing portion for a next iteration; and when the measured energy satisfies the convergence rule, the method includes obtaining a plurality of optimal variational parameters for the Hamiltonian system.

17 Claims, 6 Drawing Sheets

(56) References Cited

OTHER PUBLICATIONS

McArdle et al. "Variational ansatz-based quantum simulation of imaginary time evolution", npj Quantum Information (2019)5:75 ; https://doi.org/10.1038/s41534-019-0187-2. Sep. 6, 2019. 6 Pages. (Year: 2019).*
International Search Report and Written Opinion of the International Searching Authority regarding PCT/US20/37520 dated Sep. 14, 2020, 12 pages.
McArdle, S. et al., "Variational ansatz-based quantum stimulation of imaginary time evolution," Sep. 17, 2019, retrieved from the Internet: https://arxiv.org/abs/1804.03023, 14 pages.
Pilati, S. et al., "Self-learning projective quantum Monte Carlo simulations guided by restricted Boltamann machine," Jul. 1, 2019, retrieved from the Internet: https://arxiv.org/abs/1907.00907, 12 pages.
Endo, S. et al., "Variational quantum algorithms for discovering Hamiltonian spectra," Jul. 5, 2018, retrieved from the Internet: https://arxiv.org/abs/1806.05707, 9 pages.

* cited by examiner

QUANTUM VARIATIONAL METHOD, APPARATUS, AND STORAGE MEDIUM FOR SIMULATING QUANTUM SYSTEMS

FIELD OF THE TECHNOLOGY

The present disclosure relates to simulation of quantum systems, and in particular, to a variational parameter optimizing method, apparatus, and storage medium for simulating quantum systems.

BACKGROUND OF THE DISCLOSURE

The simulation of quantum systems is utilized in a variety of different fields. However, simulating complex quantum systems with classical computers may be difficult due to an exponential scaling of required resources for the classical computers when sizes of the quantum systems increase.

The present disclosure describes a variational parameter optimizing method, apparatus and storage medium for simulating quantum systems, which address at least one of the above drawbacks.

SUMMARY

In view of this, embodiments of the present disclosure are expected to provide a variational parameter optimizing method, apparatus, and a storage medium.

According to one aspect, an embodiment of the present disclosure provides a method for obtaining a plurality of optimal variational parameters of a wavefunction for a Hamiltonian system. The method includes initializing, by a device comprising a quantum computing portion and a classical computing portion in communication with the quantum computing portion, a plurality of variational parameters of a wavefunction for a Hamiltonian system. The method includes sending, by the device, the plurality of variational parameters to the quantum computing portion to begin an iteration, so that the quantum computing portion performs a plurality of measurements to output a plurality of measurement results based on the plurality of variational parameters, the wavefunction, and the Hamiltonian system. The method includes transmitting, by the device, the plurality of measurement results from the quantum computing portion to the classical computing portion, so that the classical computing portion updates the plurality of variational parameters based on the plurality of measurement results and an update rule. The method includes determining, by the device, whether a measured energy satisfies a convergence rule. The method includes, in response to the determination that the measured energy does not satisfy the convergence rule, sending the plurality of updated variational parameters as the plurality of variational parameters to the quantum computing portion for a next iteration. The method includes, in response to the determination that the measured energy satisfies the convergence rule, setting, by the device, the plurality of updated variational parameters so as to obtain a plurality of optimal variational parameters for the Hamiltonian system.

According to another aspect, an embodiment of the present disclosure provides an apparatus for obtaining a plurality of optimal variational parameters of a wavefunction for a Hamiltonian system. The apparatus includes a memory storing instructions and a processor in communication with the memory. When the processor executes the instructions, the processor is configured to cause the apparatus to initialize a plurality of variational parameters of a wavefunction for a Hamiltonian system. When the processor executes the instructions, the processor is configured to cause the apparatus to send the plurality of variational parameters to a quantum computing portion to begin an iteration, so that the quantum computing portion performs a plurality of measurements to output a plurality of measurement results based on the plurality of variational parameters, the wavefunction, and the Hamiltonian system. When the processor executes the instructions, the processor is configured to cause the apparatus to transmit the plurality of measurement results from the quantum computing portion to a classical computing portion, so that the classical computing portion updates the plurality of variational parameters based on the plurality of measurement results and an update rule. When the processor executes the instructions, the processor is configured to cause the apparatus to determine whether a measured energy satisfies a convergence rule. When the processor executes the instructions, the processor is configured to cause the apparatus to, in response to the determination that the measured energy does not satisfy the convergence rule, send the plurality of updated variational parameters as the plurality of variational parameters to the quantum computing portion for a next iteration. When the processor executes the instructions, the processor is configured to cause the apparatus to, in response to the determination that the measured energy satisfies the convergence rule, set the plurality of updated variational parameters so as to obtain a plurality of optimal variational parameters for the Hamiltonian system.

In another aspect, an embodiment of the present disclosure provides a non-transitory computer readable storage medium storing instructions. When the instructions are executed by a processor, the instructions cause the processor to initialize a plurality of variational parameters of a wavefunction for a Hamiltonian system. When the instructions are executed by the processor, the instructions cause the processor to send the plurality of variational parameters to a quantum computing portion to begin an iteration, so that the quantum computing portion performs a plurality of measurements to output a plurality of measurement results based on the plurality of variational parameters, the wavefunction, and the Hamiltonian system. When the instructions are executed by the processor, the instructions cause the processor to transmit the plurality of measurement results from the quantum computing portion to a classical computing portion, so that the classical computing portion updates the plurality of variational parameters based on the plurality of measurement results and an update rule. When the instructions are executed by the processor, the instructions cause the processor to determine whether a measured energy satisfies a convergence rule. When the instructions are executed by the processor, the instructions cause the processor to, in response to the determination that the measured energy does not satisfy the convergence rule, send the plurality of updated variational parameters as the plurality of variational parameters to the quantum computing portion for a next iteration. When the instructions are executed by the processor, the instructions cause the processor to, in response to the determination that the measured energy satisfies the convergence rule, set the plurality of updated variational parameters so as to obtain a plurality of optimal variational parameters for the Hamiltonian system.

The embodiments of the present disclosure provide a method, an apparatus, and a non-transitory computer readable storage medium for obtaining a plurality of optimal variational parameters of a wavefunction for a Hamiltonian system. It can be seen that, in the embodiments of the present disclosure, the disclosed combination of quantum imaginary time evolution with Restricted Boltzmann Machine (RBM) ansatz may overcomes the problem associated with other quantum phase estimations, for example, requiring quantum error correction that may not be readily available in the near or intermediate term quantum computers. The disclosed method may not require difficult high-dimensional noisy classical optimization associated with other hybrid variational algorithms.

DETAILED DESCRIPTION OF THE DISCLOSURE

Figure 1:
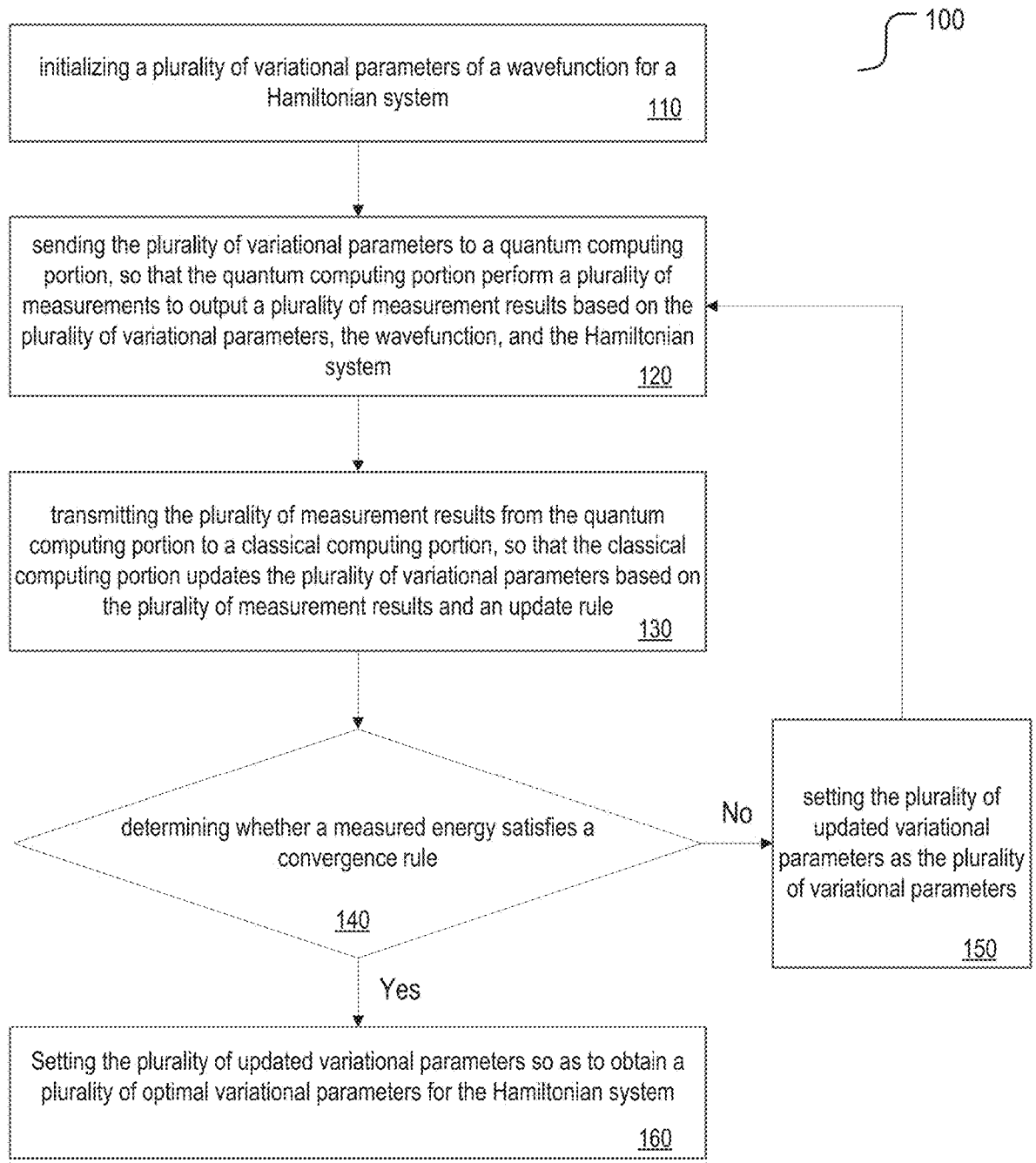
FIG. 1 is a flow diagram of an embodiment disclosed in the present disclosure.

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The simulation of quantum systems may be used in a variety of different fields, for example, pharmaceutical synthesis, design of novel catalysts and battery materials, and finding new superconducting materials. Quantum simulation may be one of the first killer applications for quantum computers. In quantum simulation, one of the major tasks may be to find the ground state of a quantum system (e.g. a molecule or solid state materials). The quantum system may be a simple molecule, for example, a hydrogen molecule, or a complex molecule, for example, a protein.

Finding a ground state of a quantum system may involve solving for the eigenstate with the lowest eigenvalue of a giant matrix, for example, a matrix based on the Hamiltonian of the quantum system. Quantum phase estimation and quantum-classical hybrid variational algorithms, such as the variational quantum eigensolver may be used to find the ground state of a quantum system.

One of the existing problems is that, simulating complex quantum systems using classical computer is difficult due to the exponential scaling of required resources as a function of system size. Another of the existing problems is that, in the context of near-term quantum computing architectures, quantum computers may have a limited number of qubits and/or may be prone to errors. For example, phase estimation may produce a nearly exact eigenstate, but may appear impractical without error correction. For another example, variational algorithms, although somewhat robust to errors and noise, may be limited in accuracy for a fixed Ansatz, and may involve difficult high-dimensional noisy classical optimization.

The present disclosure describes a method offering a computationally feasible solution to at least one of the existing problems. The method may include a quantum simulation technique to simulate a wavefunction of a quantum system with a device including at least one of a classical computing portion and a quantum computing portion. The wavefunction of the quantum system may include a plurality of variational parameters. When the plurality of variational parameters are optimized, a wavefunction of the quantum system may be obtained.

A quantum computing portion may include a quantum processor which may include a quantum computing system, for example but not limited to, superconducting circuits, trap ions, optical lattices, quantum dots, and linear optics. The quantum processor may include a number of qubits and associated local bias devices, for example, two or more qubits. A quantum processor may also employ coupling devices (i.e., "couplers") providing communicative coupling between qubits.

The present disclosure may be applied to any suitable quantum computing architecture with a quantum processor, and may not depend on the underlying architecture of the quantum processor. The quantum processor may be any suitable quantum computing architecture that may perform universal quantum computation. Examples of quantum computing architecture may include superconducting qubits, ion traps and optical quantum computer. A classical analog of quantum processor is the Central Processing Unit (CPU).

If the obtained wavefunction of the quantum system is a ground state wavefunction, a ground state energy may be calculated with E=<Ψ|H|Ψ>, wherein E is the ground state energy, H is the Hamiltonian of the quantum system, and W is the ground state wavefunction.

The present disclosure describe a method for obtaining wavefunction of a quantum system by combining quantum imaginary time evolution and Restricted Boltzmann Machine (RBM). Quantum imaginary time evolution method may be a powerful method for materials simulations in quantum computer, and the choice of the wavefunction ansatz for quantum imaginary time evolution method may limit its application potentials. Restricted Boltzmann Machine is a type of neural networks, and may be a powerful wavefunction ansatz in classical Quantum Monte Carlo simulations.

In the present disclosure, a new quantum algorithm is described for simulating the ground state of molecules or other quantum systems of interest by combing quantum imaginary time evolution and Restricted Boltzmann Machine. This algorithm may be a hybrid algorithm that performs computation using a device including a classical computing portion and a quantum computing portion. This hybrid quantum-classical method may be used for simulation of complex physical systems using noisy intermediate scale quantum computers with shallow circuits.

FIG. 1 shows a flow diagram of a method 100 for obtaining a plurality of optimal variational parameters of a wavefunction ansatz for a quantum system with a Hamiltonian. The method 100 may include step 110: initializing, by a device comprising a quantum computing portion and a classical computing portion in communication with the quantum computing portion, a plurality of variational parameters of a wavefunction for a Hamiltonian system; step 120: sending, by the device, the plurality of variational parameters to the quantum computing portion, so that the quantum computing portion perform a plurality of measurements to output a plurality of measurement results based on the plurality of variational parameters, the wavefunction, and the Hamiltonian system; step 130: transmitting, by the device, the plurality of measurement results from the quantum computing portion to the classical computing portion, so that the classical computing portion updates the plurality of variational parameters based on the plurality of measurement results and an update rule; step 140: determining, by the device, whether a measured energy satisfies a convergence rule; step 150: in response to the determination that the measured energy does not satisfy the convergence rule, sending the plurality of updated variational parameters as the plurality of variational parameters to the quantum computing portion for next round; and step 160: in response to the determination that the measured energy satisfies the convergence rule, setting, by the device, the plurality of updated variational parameters so as to obtain a plurality of optimal variational parameters for the Hamiltonian system.

Referring to FIG. 1, step 110 may include initializing, by a device comprising a quantum computing portion and a classical computing portion in communication with the quantum computing portion, a plurality of variational parameters of a wavefunction for a Hamiltonian system.

The quantum system may have a system Hamiltonian H and a ground state wavefunction Ψ. An imaginary time may be applied, i.e., τ=i*t wherein i is the imaginary unit and t is time. Under the imaginary time evolution, the ground state wavefunction may be obtained by a long-time limit of the imaginary time Schrodinger equation $$\frac{\partial |\Psi(\tau)\rangle}{\partial \tau} = -(H - E_\tau)|\Psi(\tau)\rangle.$$

The ground state energy may be obtained by $E_\tau = \langle \Psi(\tau)|H|\Psi(\tau)\rangle$. It may be difficult to directly implement the above imaginary time Schrodinger equation in a quantum computer due to the non-unitary resolution.

In one embodiment, a hybrid variational algorithm may be used. The wavefunction of the quantum system may be approximated by a parametrized trial wavefunction:

$|\Psi(\tau)\rangle = |\Psi(\vec{\theta}(\tau))\rangle = V(\vec{\theta})|\Psi(0)\rangle$, where $V(\vec{\theta})$ is a set of quantum operations realizable in quantum circuits, these operations are controlled by parameters $\vec{\theta}$. $\vec{\theta}$ may include a plurality of variational parameters. Thus, the power of the imaginary time evolution may be utilized by the parametrization of the wavefunction.

In one implementation, the equations of motion for the variational parameters $\vec{\theta}$ may satisfy $$\sum_j A_{ij} \dot{\theta}_j = C_i,$$

where A is a matrix with matrix elements $$A_{mn} = Re\left\langle \frac{\partial \Psi[\theta]}{\partial \theta_m} \bigg| \frac{\partial \Psi[\theta]}{\partial \theta_n} \right\rangle$$

and C is a vector with vector elements $$C_n = -Re\left\langle \frac{\partial \Psi[\theta]}{\partial \theta_n} \bigg| H|\Psi[\theta]\right\rangle,$$

wherein "Re" represents a real part of a complex number.

The forms of the gradients, $$\frac{\partial \Psi[\theta]}{\partial \theta_n},$$

may be obtained analytically. Then the matrix elements of A and the vector elements of C may be measured in a quantum computer. For example, $A_{mn}$ and $C_n$ may be measured in a quantum computer. In one implementation, the gradients may be obtained analytically by a traditional paper and pen method. In another implementation, the gradients may be obtained analytically via calculation by a classical computer.

Therefore, the variational parameters at the next imaginary time τ+δτ may be updated based on the variational parameters at the imaginary time τ as $\vec{\theta}(\tau+\delta\tau) = \vec{\theta}(\tau) + \vec{\dot{\theta}}(\tau)\delta\tau = \vec{\theta}(\tau) + A^{-1}(\tau)*C(\tau)\delta\tau$, where δτ may be a step of imaginary time, i.e, a timestep.

In one implementation, a Restricted Boltzmann Machine (RBM) wavefunction ansatz may be used for the quantum imaginary time evolution.

Figure 2:
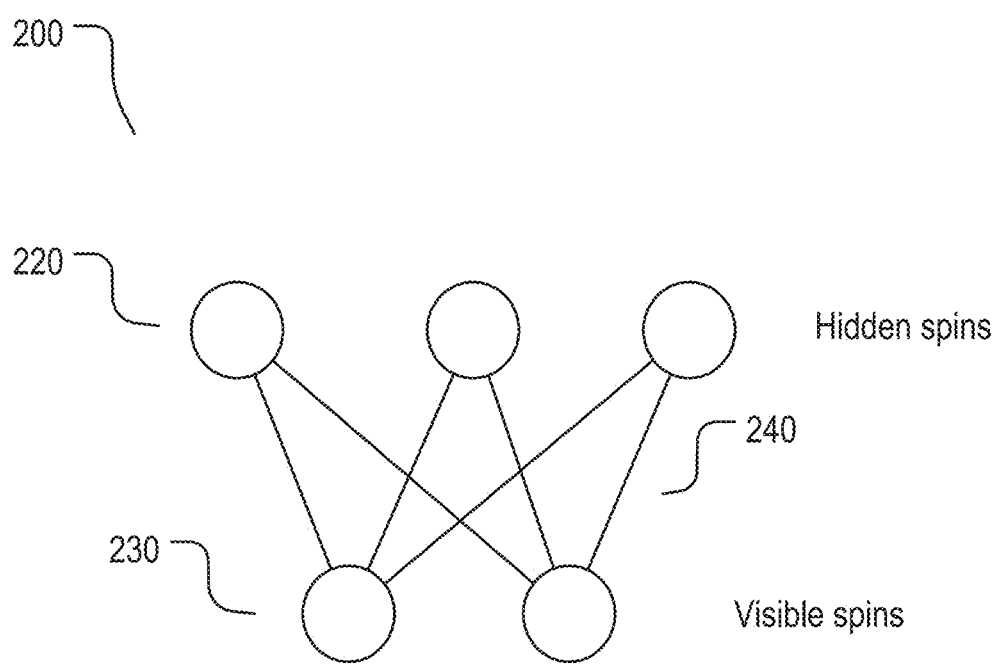
FIG. 2 is a schematic diagram of an embodiment of a Restricted Boltzmann Machine structure disclosed in the present disclosure.

Referring to FIG. 2, an example of a RBM structure 200 may be used for simulating a quantum system. The RBM structure 200 may include one or more hidden spins 220 and one or more visible spins 230. A number of the one or more hidden spins 220 may be any non-zero integer, for example, 2, 3, 10, 100, or 10000. A number of the one or more visible spins 230 may be any non-zero integer, for example, 2, 3, 10, 100, or 10000.

Referring to FIG. 2, there may be connections 240 between one of the hidden spins 220 and one of the visible spins 230. In one implementation, there may be no connections between one and another of the hidden spins; and there may be no connections between one and another of the visible spins.

In one implementation using a RBM structure, a RBM wavefunction may include the following form $$|\Psi\rangle = P_+^{(h)} \frac{e^{\hat{H}_{RBM}}}{N} |++\ldots+\rangle,$$

where $P_+^{(h)}$ may be a projection operator that projects the all hidden spins onto $|+\rangle$ state, and N may be a normalization factor. For example, the $|+\rangle$ state may include $1/\sqrt{2}(|0\rangle + |1\rangle)$, wherein $|0\rangle$ may represent a hidden spin, and $|1\rangle$ may represent a visible spin. A number of $|+\rangle$ states in the RBM wavefunction may be the total number of hidden spins and visible spins in the RBM structure.

The RBM Hamiltonian is given by $$\hat{H}_{RBM}(\theta) = \sum_i b_i \hat{v}_i + \sum_j m_j \hat{h}_j + \sum_{ij} W_{ij} \hat{v}_i \hat{h}_j,$$

where v and h are Pauli-Z matrices that denote the visible and hidden spins respectively.

In the context of RBM wavefunction ansazt, variational parameters $\theta_n$ may be the coefficients in the RBM Hamiltonian (i.e. $b_i$, $m_j$ and $W_{ij}$). The variational parameters $b_i$, $m_j$ and $W_{ij}$ may be updated during the quantum imaginary time evolution.

In one implementation, initial values for a plurality of variational parameters of a wavefunction for a quantum system with a Hamiltonian may be randomly assigned. In another implementation, initial values for a plurality of variational parameters of a wavefunction for a quantum system with a Hamiltonian may be assigned based on previous experiences and/or results from a similar quantum system.

Figure 3:
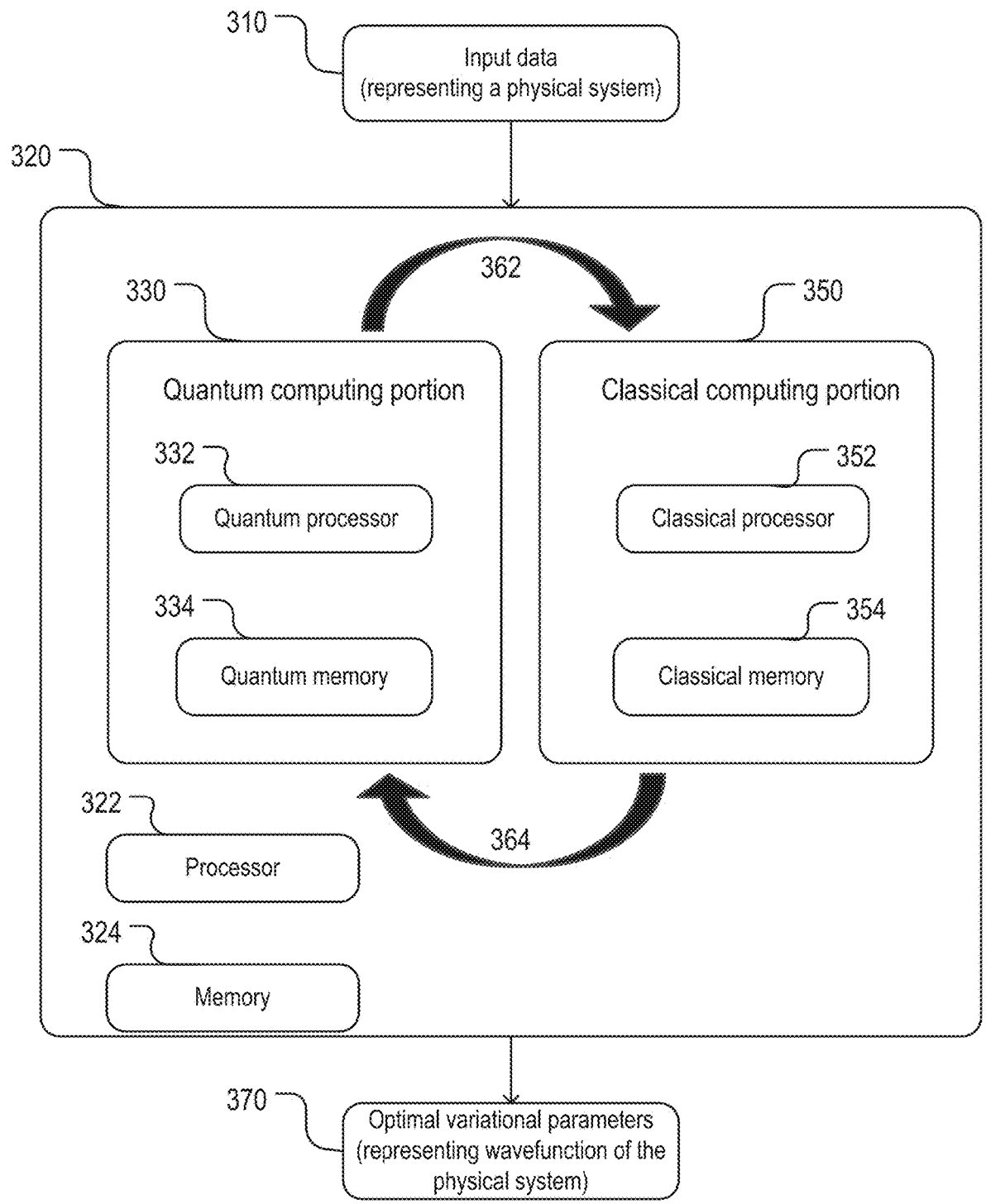
FIG. 3 is a schematic diagram of an embodiment of an apparatus disclosed in the present disclosure.

FIG. 3 shows an embodiment of a device 320 including a quantum computing portion 330 and a classical computing portion 350. The device 320 may include a memory 324 storing instructions and a processor 322 in communication with the memory. The processor may be configured to execute the instructions stored in the memory. When the processor executes the instructions, the processor may be configured to cause the device to carry out the method 100.

The quantum computing portion 330 may include a quantum processor 332 and the classical computing portion 350 may include a classical processor 352. Optionally, the quantum computing portion 330 may include a quantum memory 334. In another implementation, the quantum computing portion 330 may include a classical memory. The quantum processor 332 and/or the quantum memory 334 may be realized by a same type or different types of quantum computing systems, for example but not limited to, superconducting circuits, trap ions, optical lattices, quantum dots, and linear optics. In one implementation, the classical computing portion 350 may include a classical memory 354. Input data 310 representing a physical system may be input into the device 320, and after simulation/optimization, output data 370 including optimal variational parameters representing the wavefunction of the physical system may be output from the device 320.

Figure 4:
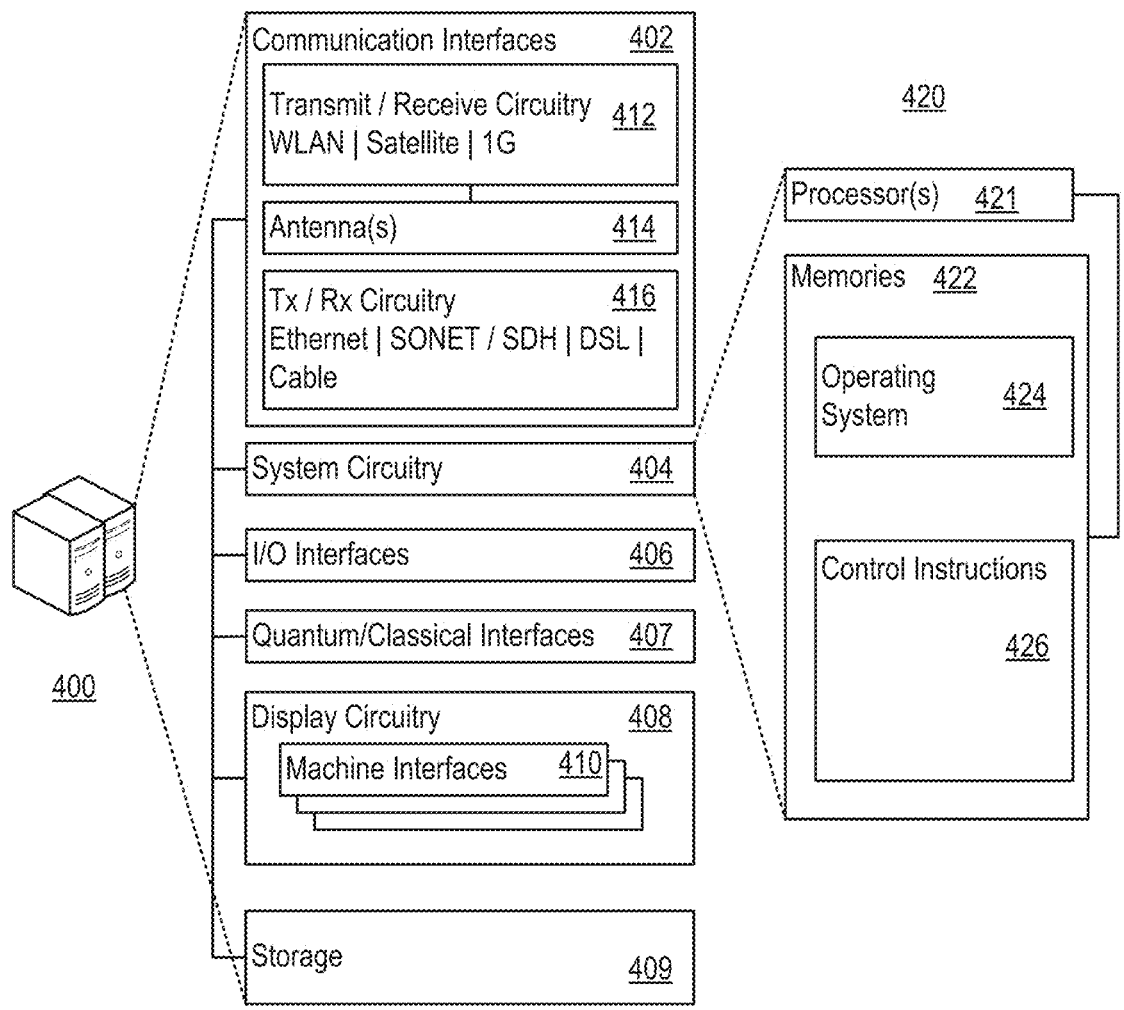
FIG. 4 illustrates a schematic diagram of a classical computer system.

Referring to FIG. 4, in one implementation, a classical computer portion may be a portion of a classical computer system 400. The classical computer system 400 may include communication interfaces 402, system circuitry 404, input/output (I/O) interfaces 406, a quantum-classical interface 407, storage 409, and display circuitry 408 that generates machine interfaces 410 locally or for remote display, e.g., in a web browser running on a local or remote machine. The machine interfaces 410 and the I/O interfaces 406 may include GUIs, touch sensitive displays, voice or facial recognition inputs, buttons, switches, speakers and other user interface elements.

The machine interfaces 410 and the I/O interfaces 406 may further include communication interfaces with the PSG, the PSA, the first detector, and/or the second detector. The communication between the computer system 400 and the PSG, the PSA, the first detector, and/or the second detector may include wired communication or wireless communication. The communication may include but not limited to, a serial communication, a parallel communication; an Ethernet communication, a USB communication, and a general purpose interface bus (GPIB) communication.

Additional examples of the I/O interfaces 406 include microphones, video and still image cameras, headset and microphone input/output jacks, Universal Serial Bus (USB) connectors, memory card slots, and other types of inputs. The I/O interfaces 406 may further include magnetic or optical media interfaces (e.g., a CDROM or DVD drive), serial and parallel bus interfaces, and keyboard and mouse interfaces. The quantum-classical interface may include a interface communicating with a quantum computer.

The communication interfaces 402 may include wireless transmitters and receivers ("transceivers") 412 and any antennas 414 used by the transmitting and receiving circuitry of the transceivers 412. The transceivers 412 and antennas 414 may support Wi-Fi network communications, for instance, under any version of IEEE 802.11, e.g., 802.11n or 802.11ac. The communication interfaces 402 may also include wireline transceivers 416. The wireline transceivers 416 may provide physical layer interfaces for any of a wide range of communication protocols, such as any type of Ethernet, data over cable service interface specification (DOCSIS), digital subscriber line (DSL), Synchronous Optical Network (SONET), or other protocol. In another implementation, the communication interfaces 402 may further include communication interfaces with the PSG, the PSA, the first detector, and/or the second detector.

The storage 409 may be used to store various initial, intermediate, or final data. In one implementation, the storage 409 of the computer system 400 may be integral with a database server. The storage 409 may be centralized or distributed, and may be local or remote to the computer system 400. For example, the storage 409 may be hosted remotely by a cloud computing service provider.

The system circuitry 404 may include hardware, software, firmware, or other circuitry in any combination. The system circuitry 404 may be implemented, for example, with one or more systems on a chip (SoC), application specific integrated circuits (ASIC), microprocessors, discrete analog and digital circuits, and other circuitry.

For example, the system circuitry 404 (also 420) may include one or more instruction processors 421 and memories 422. The memories 422 stores, for example, control instructions 426 and an operating system 424. The control instructions 426, for example may include instructions for generating a patterned mask or for controlling PSA. In one implementation, the instruction processors 421 execute the control instructions 426 and the operating system 424 to carry out any desired functionality related to the controller.

Figure 5:
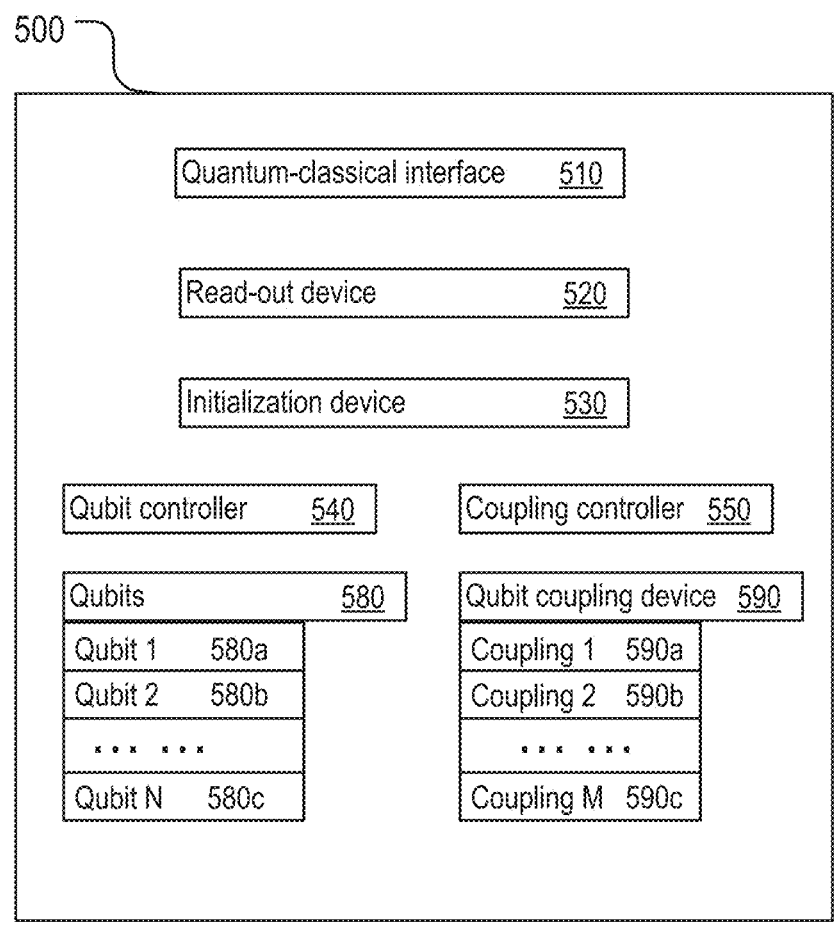
FIG. 5 illustrates a schematic diagram of a quantum computer system.

Referring to FIG. 5, in one implementation, a quantum computer portion may be a portion of a quantum computer system 500. The quantum computer system 500 may include a quantum-classical interface 510, a read-out device 520, an initialization device 530, a qubit controller 540, and a coupling controller 550. The quantum-classical interface 510 may provide an interface to communicate with a classical computer. The initialization device 530 may initialize the quantum computer system 500.

The quantum computer system 500 may include a form of a quantum processor which includes a plurality of qubits including qubit 1 580a, qubit 2 580b, . . . , and qubit N 580c. The plurality of qubits may form an interconnected topology. The quantum computer system 500 may include a plurality of coupling devices including coupling 1 590a, coupling 2 590b, . . . , and coupling M 590c.

The readout device 520 may connect to the plurality of qubits within interconnected topology 580. The readout device 520 may output a voltage or current signal which may be digital or analog signal. The qubit controller 540 may include one or more controllers for interconnected topology of the plurality of qubits. The coupling controller 550 may include one or more coupling controllers for the plurality of coupling devices. Each respective coupling controller may be configured to tune the coupling strength of a corresponding coupling device from zero to a maximum value. Coupling devices may be tuned, for example, to provide coupling between two or more corresponding qubits.

Referring to FIG. 1, step 120 may include sending, by the device, the plurality of variational parameters to the quantum computing portion, so that the quantum computing portion perform a plurality of measurements to output a plurality of measurement results based on the plurality of variational parameters, the wavefunction, and the Hamiltonian system.

The initialized variational parameters is sent to the quantum computing portion 330 of FIG. 3. In one implementation, the information of initialized variational parameters may be sent to the quantum computing portion via a sequence of quantum gates. For example, in the case of superconducting qubits, the information of initialized variational parameters may be sent via a sequence of microwave pulses, wherein details of these quantum gates, for example, pulse amplitude and/or phases, may depend on the variational parameters.

The quantum computing portion may perform a plurality of measurements via measurement of the states of the qubits in the quantum computing portion. The quantum computing portion 330 may measure a series of measurements which may include energy corresponding to the wavefunction including the variational parameters. The energy may be measured based on $E_\tau = \langle \Psi(\tau)|H|\Psi(\tau) \rangle$.

In one implementation, the series of measurements by the quantum computing portion may include the measurement of matrix elements based on $$A_{mn} = Re\left\langle \frac{\partial \Psi[\theta]}{\partial \theta_m} \middle| \frac{\partial \Psi[\theta]}{\partial \theta_n} \right\rangle \text{ and } C_n = -Re\left\langle \frac{\partial \Psi[\theta]}{\partial \theta_n} \middle| H|\Psi[\theta] \right\rangle.$$

Referring to FIG. 1, step 130 may include transmitting, by the device, the plurality of measurement results from the quantum computing portion to the classical computing portion, so that the classical computing portion updates the plurality of variational parameters based on the plurality of measurement results and an update rule.

The quantum computing portion may transmit the plurality of measurement results to the classical computing portion as shown by an arrow 362 of FIG. 3. The classical computer portion may take a timestep and update the plurality of variational parameters based on the timestep, the plurality of measurement results, and the update rule. In one implementation, the update rule may include $\vec{\theta}(\tau+\delta\tau) = \vec{\theta}(\tau) + \dot{\vec{\theta}}(\tau)\delta\tau = \vec{\theta}(\tau) + A^{-1}(\tau)*C(\tau)\delta\tau$, wherein A is the matrix with matrix elements $$A_{mn} = Re\left\langle \frac{\partial \Psi[\theta]}{\partial \theta_m} \middle| \frac{\partial \Psi[\theta]}{\partial \theta_n} \right\rangle$$

measured by the quantum computing portion, $A^{-1}$ is an inverse matrix of A, and C is the vector with vector elements $$C_n = -Re\left\langle \frac{\partial \Psi[\theta]}{\partial \theta_n} \middle| H|\Psi[\theta] \right\rangle$$

measured by the quantum computing portion.

In one implementation, the timestep may be a pre-determined fixed value, for example but not limited to, 0.1, 0.001, and 0.000001.

In another implementation, the timestep may be a variable value, for example, the timestep may depend on a convergence condition of a measured energy. For example, when a difference of the measured energy in the present iteration and the measured energy in the previous iteration gets smaller, the timestep may get smaller as well.

Referring to FIG. 1, step 140 may include determining, by the device, whether a measured energy satisfies a convergence rule.

In one implementation, the classical computing portion may calculate the difference between a measured energy in the present iteration and a measured energy in the previous iteration, and determine whether the difference satisfies the convergence rule. For example, the convergence rule may include determining whether the difference is smaller than a predetermined threshold. For example, the predetermined threshold may be $1 \times 10^{-4}$, $1 \times 10^{-6}$, or $1 \times 10^{-9}$.

In another implementation, the convergence rule may include determining whether a ratio of the difference and a corresponding measured energy is smaller than a predetermined threshold. For example, for one measured energy in the present iteration (E+dE) and the measured energy in the previous iteration (E), the difference is dE, and thus the ratio of the difference and the corresponding measured energy equals to dE/E. For example, the predetermined threshold may be $1 \times 10^{-4}$, $5 \times 10^{-6}$, or $2 \times 10^{-9}$.

In one implementation, the difference may be the absolute value of the difference between the measured energy in the present iteration and the measured energy in the previous iteration.

Referring to FIG. 1, step 150 may include, in response to the determination that the measured energy does not satisfy the convergence rule, sending the plurality of updated variational parameters as the plurality of variational parameters to the quantum computing portion for next iteration.

When the measured energy does not satisfy the convergence rule, the classical computing portion may set the plurality of updated variational parameters as the plurality of variational parameters; and may repeat step 120 as a next iteration. Thus, the plurality of variational parameters are sent to the quantum computing portion as shown by an arrow 364 of FIG. 3, and the quantum computing portion perform a plurality of measurements to output a plurality of measurement results.

Referring to FIG. 1, step 160 may include, in response to the determination that the measured energy satisfies the convergence rule, setting, by the device, the plurality of updated variational parameters so as to obtain a plurality of optimal variational parameters for the Hamiltonian system.

When the measured energy satisfies the convergence rule, the classical computing portion may set the plurality of updated variational parameters as the plurality of optimal variational parameters for the Hamiltonian system.

Optionally, the device 320 of FIG. 3 may also output the measured energy of a final iteration as a ground state energy of Hamiltonian system.

In another embodiment, step 140 may include determine whether a number of iterations reaches a predetermined iteration threshold. The predetermined iteration threshold may be 1000, 20000, and etc. Step 150 may include, in response to the determination that the number of iterations does not reach the predetermined iteration threshold, sending the plurality of updated variational parameters as the plurality of variational parameters to the quantum computing portion for next iteration. Step 160 may include, in response to the determination that the number of iterations reaches the predetermined iteration threshold, setting, by the device, the plurality of updated variational parameters so as to obtain a plurality of optimal variational parameters for the Hamiltonian system.

Example—Hydrogen Molecule

A hydrogen molecule may include two hydrogen atoms. A Hamiltonian of the hydrogen molecule may be described by a two-qubit Hamiltonian $H(R)=g_0(R)+g_1(R)\sigma_{z1}+g_2(R)\sigma_{z2}+g_3(R)\sigma_{z1}\sigma_{z2}+g_4(R)\sigma_{y1}\sigma_{y2}+g_5(R)\sigma_{x1}\sigma_{x2}$, where R is the distance between the two hydrogen atoms (i.e. bond length), and $g_i$ are coefficients that depends on R.

A RBM structure including 2 visible spins and 2 hidden spins may be used to simulate the hydrogen molecule. A corresponding RBM Hamiltonian may be $$\hat{H}_{RBM}(\theta) = \sum_{i=1,2} b_i \hat{v}_i + \sum_{j=1,2} m_j \hat{h}_j + \sum_{i,j=1,2} W_{ij} \hat{v}_i \hat{h}_j.$$

The RBM wavefunction may be $$|\Psi(\theta)\rangle = \frac{\hat{P}_+^{(h)} e^{\hat{H}_{RBM}}}{N} |++++\rangle,$$

where $\hat{P}_+^{(h)}|+\rangle\langle+|_{j=1} \otimes |+\rangle\langle+|_{j=2}$ may be a projection operator that projects the two hidden spins onto $|+\rangle$ state. The normalization constant N may be $N= \sqrt{\langle++++|e^{\hat{H}_{RBM}} \hat{P}_+^{(h)} e^{\hat{H}_{RBM}}|++++\rangle}$.

The gradients may be computed analytically. In the case where $b_i$, $m_j$ and $W_{ij}$ are real, gradients may be:

$$\left|\frac{\partial \Psi}{\partial b_i}\right\rangle = \frac{\hat{P}_+^{(h)}(\hat{v}_i - \langle\hat{v}_i\rangle)|\psi\rangle}{N} - Re[\langle\psi|\hat{P}_+^{(h)}(\hat{v}_i - \langle\hat{v}_i\rangle)|\psi\rangle] * \frac{|\Psi\rangle}{N^2}$$

$$\left|\frac{\partial \Psi}{\partial m_j}\right\rangle = \frac{\hat{P}_+^{(h)}(\hat{h}_j - \langle\hat{h}_j\rangle)|\psi\rangle}{N} - Re[\langle\psi|\hat{P}_+^{(h)}(\hat{h}_j - \langle\hat{h}_j\rangle)|\psi\rangle] * \frac{|\Psi\rangle}{N^2}$$

$$\left|\frac{\partial \Psi}{\partial W_{ij}}\right\rangle = \frac{\hat{P}_+^{(h)}(\hat{v}_i\hat{h}_j - \langle\hat{v}_i\hat{h}_j\rangle)|\psi\rangle}{N} - Re[\langle\psi|\hat{P}_+^{(h)}(\hat{v}_i\hat{h}_j - \langle\hat{v}_i\hat{h}_j\rangle)|\psi\rangle] * \frac{|\Psi\rangle}{N^2}$$

wherein $$|\psi\rangle = \frac{e^{\hat{H}_{RBM}}|++++\rangle}{\langle++++|e^{2\hat{H}_{RBM}}|++++\rangle}$$

and $\langle\hat{X}\rangle = \langle\psi|\hat{X}|\psi\rangle$. In this example of the quantum system with the hydrogen molecule, the coefficients may be real.

Once these gradients are known, the matrix elements of $$A_{mn} = Re\left\langle\frac{\partial \Psi[\theta]}{\partial \theta_m}\bigg|\frac{\partial \Psi[\theta]}{\partial \theta_n}\right\rangle$$

and vector elements of $$C_n = -Re\left\langle\frac{\partial \Psi[\theta]}{\partial \theta_n}\bigg|H|\Psi[\theta]\right\rangle$$

may be obtained in a quantum computing portion by measuring the expectation of various operators (e.g. $\langle v_i\rangle$, $\langle h_i\rangle$, $\langle v_i h_j\rangle$, $\langle P_+^{(h)} v_i\rangle$ . . . ).

Once all the matrix elements in A and C are found, for example, from measurements by a quantum computing portion, a classical computing portion may update the variational parameters according to $$\vec{\theta}(\tau+\delta\tau)=\vec{\theta}(\tau)+\vec{\theta}(\tau)\delta\tau=\vec{\theta}(\tau)+A^{-1}(\tau)*C(\tau)\delta\tau.$$

For any given distance between the two hydrogen atoms (i.e., a bond length), the ground state energy may be computed from the RBM ansatz using step size of $\delta\tau=0.01$ and 1000 total number of iterations.

Figure 6:
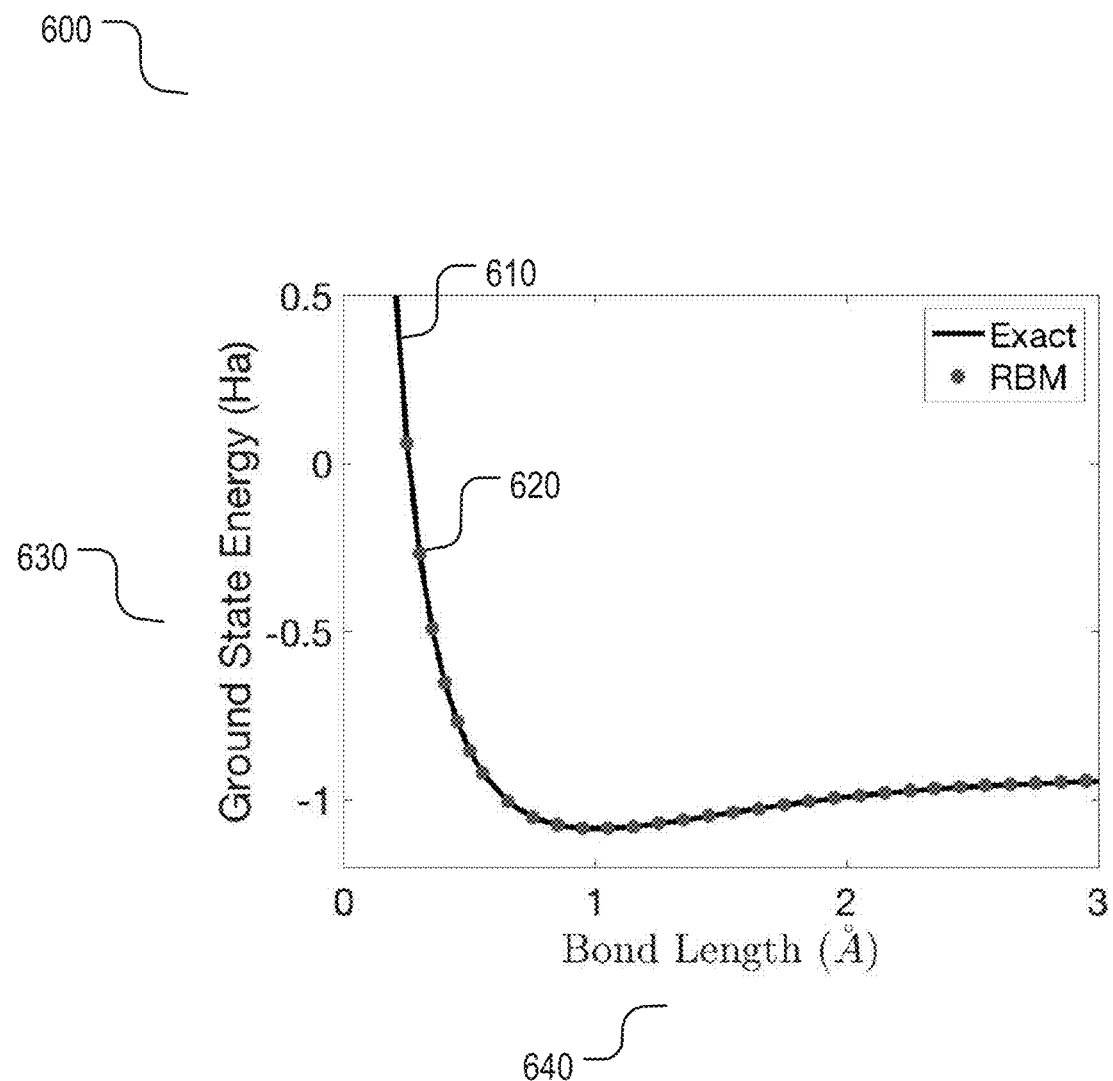
FIG. 6 is a chart of an example of ground-state energies of Hydrogen molecule simulated with the disclosed method.

FIG. 6 shows a chart 600 of ground state energy of a hydrogen molecule as a function of the bond length. Ground state energy may be plotted along a y-axis 630 and bond length may be plotted along an x-axis 640.

The ground state energy computed from the RBM ansatz are dots 620; and the ground state energy calculated from exact diagonalization is a solid line 610. The two results (the solid line 610 and the dots 620) agree well with each other for the bond length between 0 and 3 Angstrom.

The present disclosure provide a method, an apparatus, and a non-transitory computer readable storage medium for obtaining a plurality of optimal variational parameters of a wavefunction for a Hamiltonian system. The present disclosure describes a combination of a quantum imaginary time evolution and Restricted Boltzmann Machine (RBM) ansatz which may overcome the problem associated with other quantum phase estimations, for example, requiring quantum error correction that may not be readily available in the near or intermediate term quantum computers. The disclosed method may not require difficult high-dimensional noisy classical optimization associated with other hybrid variational algorithms.

While the particular invention has been described with reference to illustrative embodiments, this description is not meant to be limiting. Various modifications of the illustrative embodiments and additional embodiments of the invention will be apparent to one of ordinary skill in the art from this description. Those skilled in the art will readily recognize that these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A method for obtaining a plurality of optimal variational parameters of a wavefunction for a Hamiltonian system, the method comprising:

initializing, by a device comprising a quantum computing portion and a classical computing portion in communication with the quantum computing portion, a plurality of variational parameters of the wavefunction for the Hamiltonian system;

sending, by the device, the plurality of variational parameters to the quantum computing portion to begin an iteration, so that the quantum computing portion performs a plurality of measurements to output a plurality of measurement results based on the plurality of variational parameters, the wavefunction, and the Hamiltonian system;

transmitting, by the device, the plurality of measurement results from the quantum computing portion to the classical computing portion, so that the classical computing portion updates the plurality of variational parameters based on the plurality of measurement results and an update rule;

determining, by the device, whether a measured energy satisfies a convergence rule;

in response to the determination that the measured energy does not satisfy the convergence rule, sending the plurality of updated variational parameters as the plurality of variational parameters to the quantum computing portion for a next iteration; and in response to the determination that the measured energy satisfies the convergence rule, setting, by the device, the plurality of updated variational parameters so as to obtain a plurality of optimal variational parameters for the Hamiltonian system, wherein:

the Hamiltonian system comprises a Hamiltonian H and a ground-state wavefunction $\Psi(\tau)$, the ground-state wavefunction $\Psi(\tau)$ satisfies imaginary time Schrodinger equation $$\frac{\partial |\Psi(\tau)\rangle}{\partial \tau} = -(H - E_\tau)|\Psi(\tau)\rangle,$$

wherein $\tau=i*t$, i is an imaginary unit, t is time, and $E_\tau$ is an energy of the Hamiltonian system, and the ground-state wavefunction $\Psi(\tau)$ includes an approximated parametrized wavefunction comprising $|\Psi(\tau)\rangle = |\Psi(\vec{\theta}(\tau))\rangle = V(\vec{\theta})|\Psi(0)\rangle$, where $V(\vec{\theta})$ is a set of quantum operations realizable in quantum circuits, $\vec{\theta}$ includes a plurality of variational parameters.

2. The method according to claim 1, wherein the initializing the plurality of variational parameters comprises:

initializing, by the device, the plurality of variational parameters randomly.

3. The method according to claim 1, wherein:

the plurality of measurements comprises a plurality of gradients $$\frac{\partial \Psi[\theta]}{\partial \theta_n},$$

wherein $\theta_n$ is one of the plurality of variational parameters and n is an index for the plurality of variational parameters.

4. The method according to claim 3, wherein:

the update rule comprises $\vec{\theta}(\tau+\delta\tau) = \vec{\theta}(\tau) + \dot{\vec{\theta}}(\tau)\delta\tau = \vec{\theta}(\tau) + A^{-1}(\tau)*C(\tau)\delta\tau$, wherein $\delta\tau$ is a timestep, A is a matrix with matrix elements $$A_{mn} = \text{Re}\left\langle \frac{\partial \Psi[\theta]}{\partial \theta_m} \bigg| \frac{\partial \Psi[\theta]}{\partial \theta_n} \right\rangle,$$

$A^{-1}$ is an inverse matrix of A, C is a vector with vector elements $$C_n = -\text{Re}\left\langle \frac{\partial \Psi[\theta]}{\partial \theta_n} \bigg| H | \Psi[\theta] \right\rangle, \text{ and } \sum_j A_{ij}\dot{\theta}_j = C_i.$$

and m, n, k, and j are indexes for matrix elements in A.

5. The method according to claim 1, wherein:

the wavefunction comprises a restricted Boltzmann machine (RBM) wavefunction with a RBM structure, which satisfies $$|\Psi\rangle = P_+^{(h)} \frac{e^{\hat{H}_{RBM}}}{N} |+ + \ldots +\rangle,$$

wherein $P_+^{(h)}$ is a projection operator that projects hidden spins in the RBM structure onto a $|+\rangle$ state, N is a normalization factor, the $|+\rangle$ state includes $1/\sqrt{2}(|0\rangle + |1\rangle)$, $|0\rangle$ represents a hidden spin in the RBM structure, $|1\rangle$ represents a visible spin in the RBM structure, a number of $|+\rangle$ states in the RBM wavefunction is a number of hidden spins and visible spins in the RBM structure, and $\hat{H}_{RBM}$ is a RBM Hamiltonian.

6. The method according to claim 1, further comprising:
obtaining a ground-state wavefunction based on the plurality of optimal variational parameters for the Hamiltonian system; and
obtaining a quantum property of the Hamiltonian system based on the obtained ground-state wavefunction.

7. An apparatus for obtaining a plurality of optimal variational parameters of a wavefunction for a Hamiltonian system, the apparatus comprising:
a memory storing instructions; and
a processor in communication with the memory, wherein, when the processor executes the instructions, the processor is configured to cause the apparatus to:
initialize a plurality of variational parameters of a wavefunction for a Hamiltonian system,
send the plurality of variational parameters to a quantum computing portion to begin an iteration, so that the quantum computing portion performs a plurality of measurements to output a plurality of measurement results based on the plurality of variational parameters, the wavefunction, and the Hamiltonian system,
transmit the plurality of measurement results from the quantum computing portion to a classical computing portion, so that the classical computing portion updates the plurality of variational parameters based on the plurality of measurement results and an update rule,
determine whether a measured energy satisfies a convergence rule,
in response to a determination that the measured energy does not satisfy the convergence rule, send the plurality of updated variational parameters as the plurality of variational parameters to the quantum computing portion for a next iteration, and
in response to a determination that the measured energy satisfies the convergence rule, set the plurality of updated variational parameters so as to obtain a plurality of optimal variational parameters for the Hamiltonian system,
wherein:
the Hamiltonian system comprises a Hamiltonian H and a ground-state wavefunction $\Psi(\tau)$, which satisfy imaginary time Schrodinger equation $$\frac{\partial |\Psi(\tau)\rangle}{\partial \tau} = -(H - E_\tau)|\Psi(\tau)\rangle,$$

wherein $\tau = i*t$, i is an imaginary unit, t is time, and $E_\tau$ is a ground state energy, and
the ground-state wavefunction $\Psi(\tau)$ includes an approximated parametrized wavefunction comprising $$|\Psi(\tau)\rangle = |\Psi(\vec{\theta}(\tau))\rangle = V(\vec{\theta})|\Psi(0)\rangle,$$ where $V(\vec{\theta})$ is a set of quantum operations realizable in quantum circuits, $\vec{\theta}$ includes a plurality of variational parameters.

8. The apparatus according to claim 7, wherein, when the processor is configured to cause the apparatus to initialize the plurality of variational parameters, the processor is configured to further cause the apparatus to:
initialize the plurality of variational parameters randomly.

9. The apparatus according to claim 7, wherein:
the plurality of measurements comprises a plurality of gradients $$\frac{\partial \Psi[\theta]}{\partial \theta_n},$$

wherein $\theta_n$ is one of the plurality of variational parameters and n is an index for the plurality of variational parameters.

10. The apparatus according to claim 9, wherein:
the update rule comprises
$\vec{\theta}(\tau+\delta\tau) = \vec{\theta}(\tau) + \dot{\vec{\theta}}(\tau)\delta\tau = \vec{\theta}(\tau) + A^{-1}(\tau)*C(\tau)\delta\tau$, wherein $\delta\tau$ is a timestep, A is a matrix with matrix elements $$A_{mn} = \text{Re}\left\langle \frac{\partial \Psi[\theta]}{\partial \theta_m} \bigg| \frac{\partial \Psi[\theta]}{\partial \theta_n} \right\rangle,$$

$A^{-1}$ is an inverse matrix of A, C is a vector with vector elements $$C_n = -\text{Re}\left\langle \frac{\partial \Psi[\theta]}{\partial \theta_n} \bigg| H | \Psi[\theta]\right\rangle, \text{ and } \sum_j A_{ij}\dot{\theta}_j = C_i.$$

and m, n, k, and j are indexes for matrix elements in A.

11. The apparatus according to claim 7, wherein:
the wavefunction comprises a Boltzmann machine (RBM) wavefunction with a RBM structure, which satisfies $$|\Psi\rangle = P_+^{(h)} \frac{e^{\hat{H}_{RBM}}}{N} |+ + \ldots +\rangle,$$

wherein $P_+^{(h)}$ is a projection operator that projects hidden spins in the RBM structure onto a $|+\rangle$ state, N is a normalization factor, the $|+\rangle$ state includes $1/\sqrt{2}(|0\rangle + |1\rangle)$, $|0\rangle$ represents a hidden spin in the RBM structure, $|1\rangle$ represents a visible spin in the RBM structure, a number of $|+\rangle$ states in the RBM wavefunction is a number of hidden spins and visible spins in the RBM structure, and $\hat{H}_{RBM}$ is a RBM Hamiltonian.

12. The apparatus according to claim 7, wherein, when the processor executes the instructions, the processor is configured to further cause the apparatus to:
obtain a ground-state wavefunction based on the plurality of optimal variational parameters for the Hamiltonian system; and
obtain a quantum property of the Hamiltonian system based on the obtained ground-state wavefunction.

13. A non-transitory computer readable storage medium storing instructions, wherein the instructions, when executed by a processor, cause the processor to:
initialize a plurality of variational parameters of a wavefunction for a Hamiltonian system;
send the plurality of variational parameters to a quantum computing portion to begin an iteration, so that the quantum computing portion performs a plurality of measurements to output a plurality of measurement results based on the plurality of variational parameters, the wavefunction, and the Hamiltonian system;

transmit the plurality of measurement results from the quantum computing portion to a classical computing portion, so that the classical computing portion updates the plurality of variational parameters based on the plurality of measurement results and an update rule;

determine whether a measured energy satisfies a convergence rule;

in response to a determination that the measured energy does not satisfy the convergence rule, send the plurality of updated variational parameters as the plurality of variational parameters to the quantum computing portion for a next iteration; and in response to a determination that the measured energy satisfies the convergence rule, set the plurality of updated variational parameters so as to obtain a plurality of optimal variational parameters for the Hamiltonian system, wherein:

the Hamiltonian system comprises a Hamiltonian H and a ground-state wavefunction $\Psi(\tau)$, which satisfy imaginary time Schrondinger equation $$\frac{\partial |\Psi(\tau)\rangle}{\partial \tau} = -(H - E_\tau)|\Psi(\tau)\rangle,$$

wherein $\tau = i*t$, i is an imaginary unit, t is time, and $E_\tau$ is a ground state energy, and the ground-state wavefunction $\Psi(\tau)$ includes an approximated parametrized wavefunction comprising $|\Psi(\tau)\rangle = |\Psi(\vec{\theta}(\tau))\rangle = V(\vec{\theta})|\Psi(0)\rangle$, where $V(\vec{\theta})$ is a set of quantum operations realizable in quantum circuits, $\vec{\theta}$ includes a plurality of variational parameters.

14. The non-transitory computer readable storage medium according to claim 13, wherein, when the instructions cause the processor to initialize the plurality of variational parameters, the instructions cause the processor to:

initialize the plurality of variational parameters randomly.

15. The non-transitory computer readable storage medium according to claim 13, wherein:

the plurality of measurements comprises a plurality of gradients $$\frac{\partial \Psi[\theta]}{\partial \theta_n},$$

wherein $\theta_n$ is one of the plurality of variational parameters an n is an index for the plurality of variational parameters.

16. The non-transitory computer readable storage medium according to claim 15, wherein:

the update rule comprises $\vec{\theta}(\tau+\delta\tau) = \vec{\theta}(\tau) + \dot{\vec{\theta}}(\tau)\delta\tau = \vec{\theta}(\tau) + A^{-1}(\tau)*C(\tau)\delta\tau$, wherein $\delta\tau$ is a timestep, A is a matrix with matrix elements $$A_{mn} = \mathrm{Re}\left\langle\frac{\partial \Psi[\theta]}{\partial \theta_m} \bigg| \frac{\partial \Psi[\theta]}{\partial \theta_n}\right\rangle,$$

$A^{-1}$ is an inverse matrix of A, C is a vector with vector elements $$C_n = -\mathrm{Re}\left\langle\frac{\partial \Psi[\theta]}{\partial \theta_n} \bigg| H | \Psi[\theta]\right\rangle, \text{ and } \sum_j A_{ij}\dot{\theta}_j = C_i.$$

and m, n, k, and j are indexes for matrix elements in A.

17. The non-transitory computer readable storage medium according to claim 13, wherein:

the wavefunction comprises a Boltzmann machine (RBM) wavefunction with a RBM structure, which satisfies $$|\Psi\rangle = P_+^{(h)}\frac{e^{\hat{H}_{RBM}}}{N}|+ + \ldots +\rangle,$$

wherein $P_+^{(h)}$ is a projection operator that projects hidden spins in the RBM structure onto a $|+\rangle$ state, N is a normalization factor, the $|+\rangle$ state includes $1/\sqrt{2}(|0\rangle + |1\rangle)$, $|0\rangle$ represents a hidden spin in the RBM structure, $|1\rangle$ represents a visible spin in the RBM structure, a number of $|+\rangle$ states in the RBM wavefunction is a number of hidden spins and visible spins in the RBM structure, and $\hat{H}_{RBM}$ is a RBM Hamiltonian.

* * * * *

UNITED STATES PATENT AND TRADEMARK OFFICE
CERTIFICATE OF CORRECTION

PATENT NO. : 11,314,536 B2
APPLICATION NO. : 16/505179
DATED : April 26, 2022
INVENTOR(S) : Chee Kong Lee et al.

It is certified that error appears in the above-identified patent and that said Letters Patent is hereby corrected as shown below:

In the Claims

Column 14, Claim 4, Lines 34-35 (2nd and 3rd lines of Claim 4), delete the element at the end of the line and beginning of the next line and before ", wherein", and insert in its place $$--\vec{\theta}(\tau+\delta\tau)=\vec{\theta}(\tau)+\dot{\vec{\theta}}(\tau)\delta\tau=\vec{\theta}(\tau)+A^{-1}(\tau)*C(\tau)\delta\tau--.$$

Column 14, Claim 4, between Lines 45-50, between the two elements, delete "and".

Column 14, Claim 4, between Lines 45-50, delete the second element and delete "." after the word "and" and insert in its place $--\sum_{j} A_{kj}\hat{\theta}_j = C_k,--$.

Column 16, Claim 10, Line 16, delete the element before ", wherein" and insert in its place $$--\vec{\theta}(\tau+\delta\tau)=\vec{\theta}(\tau)+\dot{\vec{\theta}}(\tau)\delta\tau=\vec{\theta}(\tau)+A^{-1}(\tau)*C(\tau)\delta\tau--.$$

Column 16, Claim 10, between Lines 25-30, between the two elements, delete "and".

Column 16, Claim 10, between Lines 25-30, delete the second element and delete "." after the word "and" and insert in its place $--\sum_{j} A_{kj}\hat{\theta}_j = C_k,--$.

Column 17, Claim 13, Line 28, delete "Schrondinger" and insert in its place --Schrodinger--.

Column 18, Claim 15, Line 11, delete "an" and insert in its place --and--.

Signed and Sealed this
Eighth Day of November, 2022

*Katherine Kelly Vidal*

Katherine Kelly Vidal
*Director of the United States Patent and Trademark Office*

CERTIFICATE OF CORRECTION (continued)
U.S. Pat. No. 11,314,536 B2

Column 18, Claim 16, Line 16, delete the element before ", wherein" and insert in its place -- $\vec{\theta}(\tau+\delta\tau) = \vec{\theta}(\tau) + \dot{\vec{\theta}}(\tau)\delta\tau = \vec{\theta}(\tau) + A^{-1}(\tau) * C(\tau)\delta\tau$ --.

Column 18, Claim 16, between Lines 25-30, between the two elements, delete "and".

Column 18, Claim 16, between Lines 25-30, delete the second element and delete "." after the word "and" and insert in its place -- $\sum_j A_{kj} \dot{\theta}_j = C_k$ ,--.